United States Patent Office 3,290,301
Patented Dec. 6, 1966

3,290,301
CERTAIN 3-AMINOALKYL-5-ALKYLISOXAZOLES
Hideo Kano, Kyoto-shi, Kyoto, and Ikuo Adachi, Toyonakashi, Osaka, Japan, assignors to Shionogi & Co., Ltd., Osaka-shi, Japan
No Drawing. Filed Dec. 2, 1963, Ser. No. 327,543
11 Claims. (Cl. 260—243)

The present invention relates to therapeutically useful disubstituted isoxazole compounds and the production thereof.

The objective disubstituted isoxazole compounds are generically represented by the formula:

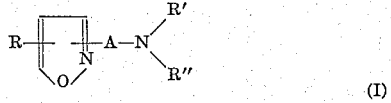
(I)

wherein A is a lower alkylene group (e.g. methylene, ethylene, propylene, isopropylene, butylene), R is a lower alkyl group (e.g. methyl, ethyl, propyl, isopropyl, butyl, pentyl), each of R' and R" independently is a hydrogen atom or a lower alkyl group (e.g. methyl, ethyl, propyl, isopropyl, butyl, pentyl) or taken together and with the adjacent nitrogen atom form a heterocyclic group of the formula:

which may be, for instance, pyrrolidino, piperidino, piperazino, N-alkylpiperazino, morpholino or thiomorpholino.

The objective isoxazole compounds (I) can be prepared by interaction of halogenoalkylisoxazole compounds represented by the formula:

(II)

wherein X is a halogen atom (e.g. chlorine, bromine) and each of R and A has the same significance as designated above with amines represented by the formula:

(III)

wherein each of R' and R" independently or conjointly and with the adjacent N has the same significance as designated above.

The one starting material of the present invention, namely the halogenoalkylisoxazole compound (II), may be prepared by various methods. One of the typical methods is shown in the following scheme:

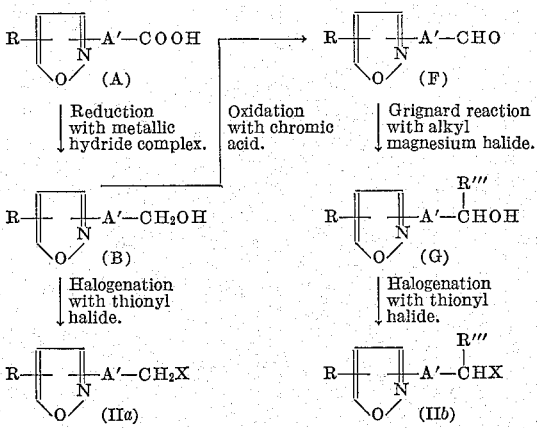

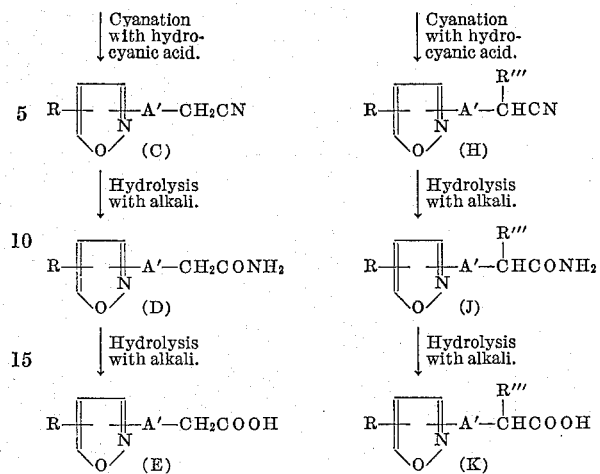

wherein R''' is a lower alkyl group (e.g. methyl, ethyl, propyl, isopropyl, butyl, pentyl), A' is nil or a lower alkylene group (e.g. methylene, ethylene, propylene, butylene, pentylene, isopropylene, isobutylene, isopentylene) and each of R and X has the same significance as designated above. Any desired halogenoalkylisoxazole compound (II) can be prepared from an isoxazolecarboxylic acid corresponding to the Formula A wherein A' is nil, according to the above series of steps or repetition or obvious modification thereof.

Examples of the other starting material of the present invention, namely the amine (III), are ammonia, aliphatic primary and secondary amines such as methylamine, ethylamine, propylamine, butylamine, dimethylamine, diethylamine, dipropylamine, dibutylamine, methylethylamine, methylisopropylamine, allylamine, diallylamine and ethylallylamine, and heterocyclic amines such as pyrrolidine, piperidine, piperazine, N-alkylpiperazine, morpholine and thiomorpholine.

According to the process of the present invention, the interaction of the halogenoalkylisoxazole compound (II) with the amine (III) may be carried out in an inert solvent medium at a wide range of temperature, if necessary in the presence of a basic substance as the acid eliminating agent. The inert solvent employed as the reaction medium may be selected, for instance, from water, aqueous alkanols, alkanols, benzene, toluene, xylene, phenol, nitrobenzene and the like in consideration of the reactivity of the starting materials. Examples of the basic substance are organic bases such as pyridine bases (e.g. pyridine, picoline, lutidine, collidine) and aliphatic amines (e.g. dimethylamine, diethylamine, triethylamine) and inorganic bases such as alkali metal carbonates (e.g. sodium carbonate, potassium carbonate), alkali metal bicarbonates (e.g. sodium bicarbonate, potassium bicarbonate) and alkaline earth metal carbonates (e.g. calcium carbonate, barium carbonate). The basic substance may be used in the form of mixture, suspension or solution in the said inert organic solvent or, in the case of liquid, alone. When the starting amine (III) is liquid, the use of excess of the same may be preferred, because it can be available not only as the reagent but also as the reaction solvent and the acid eliminating agent.

The thus prepared isoxazole compounds (I) are liquid or solid in the free state. For convenience on preparation, they may be converted into their pharmaceutically acceptable acid addition salts or pharmaceutically acceptable quaternary salts, for instance, by treating the base with an acid such as hydrochloric, hydrobromic, hydroiodic, sulfuric, nitric, phosphoric, thiocyanic, carbonic, acetic, propionic, oxalic, citric, tartaric, succinic, salicyclic, benzoic or palmitic acid or a quaternizing agent such as methyl chloride, ethyl chloride, ethyl bromide, methyl iodide, ethyl iodide, phenethyl bromide, benzenesulfonyl chloride, benzenesulfonyl bromide or p-toluenesulfonyl bromide in a suitable solvent such as water, methanol, ethanol, ether, benzene and toluene. There are thus produced the corresponding hydrochloride, hydrobromide, hydroiodide, sulfate, nitrate, phosphate, thiocyanate, carbonate, acetate, propionate, oxalate, citrate, tartrate, succinate, salicylate, benzoate or palmitate, or the corresponding methyl ammonium chloride, ethyl ammonium chloride, ethyl ammonium bromide, methyl ammonium iodide, ethyl ammonium idoide, phenethyl ammonium bromide, benzenesulfonyl ammonium chloride, benzenesulfonyl ammonium bromide, or p-toluenesulfonyl ammonium bromide.

The isoxazole compounds (I) and non-toxic salts thereof are useful as antipyretic, analgesic, antitussive and/or antiinflammatory agents. Generally speaking, exhibition of broad pharmacological effects with low toxicity is characteristic of them. The new compounds of the invention can be administered in a variety of per se conventional ways, e.g. in the form of tablets constituted e.g. by an effective single dose of active compound of the invention and a major proportion of a per se conventional carrier.

The following examples represent presently-preferred embodiments of the present invention, but it is to be understood that the examples are given by way of illustration only and not of limitation. Parts by weight bear the same relation to parts by volume as do grams to milliliters.

*Example 1*

To a solution of 3-chloromethyl-5-methylisoxazole (2.6 parts by weight) in benzene (20 parts by volume), there is added piperidine (5.1 parts by weight), and the resultant mixture is refluxed for 6 hours. After cooling, the reaction mixture is filtered. The filtrate is shaken with dilute aqueous hydrochloric acid. The hydrochloric acid extract is made alkaline with 20% aqueous sodium hydroxide solution and shaken with ether. The ether extract is washed with water, dried over anhydrous potassium carbonate and the solvent removed. The resulting liquor is distilled under reduced pressure to give 3-piperidinomethyl-5-methylisoxazole (1.2 parts by weight) as a pale yellowish liquid boiling at 90° C./0.1 mm. Hg. The hydrochloride forms colorless plates melting at 188 to 190° C., when crystallized from ethanol.

*Analysis.*—Calcd. for $C_{10}H_{16}ON_2 \cdot HCl$: C, 55.42; H, 7.91; N, 12.93. Found: C, 55.44; H, 7.80; N, 12.72.

*Example 2*

To a solution of 3-chloromethyl-5-methylisoxazole (2.6 parts by weight) in benzene (20 parts by volume), there is added morpholine (5.2 parts by weight), and the resultant mixture is reacted and treated as in Example 1. The resulting liquor is distilled under reduced pressure to give 3-morpholinomethyl-5-methylisoxazole (0.5 part by weight) as a colorless liquid boiling at 92° C./0.1 mm. Hg. The hydrochloride forms colorless needles melting at 182 to 183° C., when crystallized from ethanol.

*Analysis.*—Calcd. for $C_9H_{14}O_2N_2 \cdot HCl$: C, 49.43; H, 6.91; N, 12.81. Found: C, 49.54; H, 6.98; N, 12.64.

By replacing the morpholine by an equivalent quantity of thiomorpholine and otherwise proceeding according to this example, the 3-thiomorpholinomethyl-5-methylisoxazole is obtained.

*Example 3*

To a solution of 3-chloromethyl-5-methylisoxazole (3.9 parts by weight) in benzene (20 parts by volume), there is added diethylamine (6.6 parts by weight), and the resultant mixture is reacted in a sealed tube at 100° C. for 6 hours. The reaction mixture is treated as in Example 1. The resulting liquor is distilled under reduced pressure to give 3-diethylaminomethyl-5-methylisoxazole (2.2 parts by weight) as a colorless liquid boiling at 85° C./0.1 mm. Hg. The citrate forms colorless prisms melting at 114 to 115° C., when crystallized from ethanol.

*Analysis.*—Calcd. for $C_9H_{16}ON_2 \cdot C_6H_8O_7$: C, 49.99; H, 6.71; N, 7.77. Found: C, 49.87; H, 6.68; N, 7.59.

*Example 4*

To a solution of 3-(β-chloroethyl)-5-methylisoxazole (2.91 parts by weight) in toluene (20 parts by volume), there is added piperidine (4.25 parts by weight), and the resultant mixture is refluxed for 6 hours. After cooling, the reaction mixture is shaken with dilute aqueous hydrochloric acid. The hydrochloric acid layer is made alkaline with 20% aqueous sodium hydroxide solution and shaken with ether. The ether extract is washed with water, dried over anhydrous potassium carbonate and the solvent removed. The resulting liquor is distilled under reduced pressure to give 3-(β-piperidinoethyl)-5-methylisoxazole (1.71 parts by weight) as a pale yellowish liquid boiling at 103 to 104° C./0.8 mm. Hg. The hydrochloride forms colorless needles melting at 195 to 196° C., when crystallized from a mixture of ethanol and acetone.

*Analysis.*—Calcd. for $C_{11}H_{18}ON_2 \cdot HCl$: C, 57.26; H, 8.30; N, 12.14. Found: C, 56.90; H, 8.52; N, 12.46.

*Example 5*

To a solution of 3-(β-chloroethyl)-5-methylisoxazole (0.62 part by weight) in benzene (3 parts by volume), there is added morpholine (1.12 parts by weight), and the resultant mixture is refluxed for 4 hours. The reaction mixture is treated as in Example 4. The resulting liquor is distilled under reduced pressure to give 3-(β-morpholinoethyl)-5-methylisoxazole (0.38 part by weight) as a colorless liquid. The hydrochloride forms colorless needles melting at 209 to 210° C., when crystallized from ethanol.

*Analysis.*—Calcd. for $C_{10}H_{16}O_2N_2 \cdot HCl$: C, 51.61; H, 7.37; N, 12.04. Found: C, 51.45; H, 7.52; N, 12.29.

By replacing the morpholine by an equivalent quantity of piperazine or N-methylpiperazine and otherwise proceeding according to this example, the 3-(β-piperazinoethyl)-5-methylisoxazole and the 3-(β-N-methylpiperazinoethyl)-5-methylisoxazole, respectively, are obtained.

*Example 6*

To a solution of 3-(β-chloroethyl)-5-methylisoxazole (1.46 parts by weight) in toluene (10 parts by volume), there is added pyrrolidine (2.13 parts by weight), and the resultant mixture is refluxed for 6 hours. The reaction mixture is treated as in Example 4. The resulting liquor is distilled under reduced pressure to give 3-(β-pyrrolidinoethyl)-5-methylisoxazole (0.61 part by weight) as a pale yellowish liquid boiling at 83 to 84° C./0.7 mm. Hg. The hydrochloride forms colorless needles melting at 165 to 166° C., when crystallized from acetone.

*Analysis.*—Calcd. for $C_{10}H_{16}ON_2 \cdot HCl$: C, 55.42; H, 7.91; N, 12.93. Found: C, 55.20; H, 8.11; N, 12.94.

*Example 7*

To a solution of 3-(β-chloroethyl)-5-methylisoxazole (2.91 parts by weight) in toluene (20 parts by volume), there is added diethylamine (4.38 parts by weight), and the resultant mixture is heated in a sealed tube at 120° C. for 6 hours. The reaction mixture is treated as in Example 4. The resulting liquor is distilled under reduced pressure to give 3-(β-diethylaminoethyl)-5-methylisoxazole (0.85 part by weight) as a colorless liquid boiling at 75° C./0.5 mm. Hg. The citrate forms colorless needles melting at 150 to 151° C., when crystallized from ethanol.

*Analysis.*—Calcd. for $C_{10}H_{18}ON_2 \cdot C_6H_8O_7$: C, 51.33;

H, 7.00; N, 7.48. Found: C, 51.51; H, 7.11; N, 7.31.

What is claimed is:
1. 3-piperidino(lower)alkyl-5-lower alkylisoxazole.
2. 3-morpholino(lower)alkyl-5-lower alkylisoxazole.
3. 3-pyrrolidino(lower)alkyl-5-lower alkylisoxazole.
4. 3-piperazino(lower)alkyl-5-lower alkylisoxazole.
5. 3 - N - (lower)alkylpiperazino(lower)alkyl - 5-lower alkylisoxazole.
6. 3-thiomorpholino(lower)alkyl - 5 - lower alkylisoxazole.
7. 3-piperidinomethyl-5-methylisoxazole.
8. 3-morpholinomethyl-5-methylisoxazole.
9. 3-($\beta$-piperidinoethyl)-5-methylisoxazole.
10. 3-($\beta$-morpholinoethyl)-5-methylisoxazole.
11. 3-($\beta$-pyrrolidinoethyl)-5-methylisoxazole.

References Cited by the Examiner

Kochetkov et al.: Chem. Abstracts, vol. 50 (1956), page 3,403.

ALEX MAZEL, *Primary Examiner.*

HENRY R. JILES, *Examiner.*

R. J. GALLAGHER, *Assistant Examiner.*